US012771284B2

(12) United States Patent
Urbanek et al.

(10) Patent No.: US 12,771,284 B2
(45) Date of Patent: Oct. 20, 2026

(54) APPARATUS AND METHOD FOR PROVIDING ACTIVE HELIX PREVENTION IN A SINGLE AXIS SOLAR TRACKER SYSTEM

(71) Applicant: Terrasmart, Inc., Cincinnati, OH (US)

(72) Inventors: Ben Urbanek, Cincinnati, OH (US); Coel Schumacher, Auburn, CA (US); David Compaan, Columbus, OH (US)

(73) Assignee: Terrasmart, Inc., Cincinnati, OH (US)

( * ) Notice: Subject to any disclaimer, the term of this patent is extended or adjusted under 35 U.S.C. 154(b) by 0 days.

(21) Appl. No.: 18/410,166

(22) Filed: Jan. 11, 2024

(65) Prior Publication Data

US 2024/0266992 A1 Aug. 8, 2024

Related U.S. Application Data

(60) Provisional application No. 63/483,835, filed on Feb. 8, 2023.

(51) Int. Cl.
*H02S 20/32* (2014.01)
*H02S 50/00* (2014.01)

(52) U.S. Cl.
CPC .............. *H02S 20/32* (2014.12); *H02S 50/00* (2013.01)

(58) Field of Classification Search
CPC ................................ H02S 20/32; H02S 50/00
See application file for complete search history.

(56) References Cited

U.S. PATENT DOCUMENTS

| | | | |
|---|---|---|---|
| 8,122,878 | B1 | 2/2012 | Gross et al. |
| 8,229,581 | B2 | 7/2012 | Zalusky |
| 8,378,281 | B2 | 2/2013 | Kats et al. |
| 8,405,013 | B2 | 3/2013 | Chen et al. |
| 8,592,738 | B1 | 11/2013 | Kozin et al. |
| 8,669,462 | B2 | 3/2014 | Almogy et al. |
| 8,671,931 | B2 | 3/2014 | Curtis et al. |
| 8,686,334 | B2 | 4/2014 | Kats et al. |
| 8,844,519 | B2 | 9/2014 | Marcotte et al. |
| 8,881,415 | B2 | 11/2014 | Barton |
| 8,890,044 | B2 | 11/2014 | Sherman et al. |

(Continued)

FOREIGN PATENT DOCUMENTS

| | | |
|---|---|---|
| CN | 104539230 A | 4/2015 |
| CN | 106452323 A | 2/2017 |

(Continued)

*Primary Examiner* — Michael Y Sun

(74) *Attorney, Agent, or Firm* — Wood Herron & Evans LLP

(57) ABSTRACT

Apparatus and method for providing active helix prevention for a solar tracker system including a plurality of photovoltaic modules mounted in a single row and at least one drive motor configured to synchronously rotate the plurality of photovoltaic modules about an axis of rotation. First and second angle detectors are provided to generate first and second angle data indicative of first and second angles of rotation of the plurality of photovoltaic modules in the row at first and second locations. A controller compares the first angle data and the second angle data and transitions the at least one drive motor from an operative state to an inoperative state if there is a difference between the first angle data and the second angle data that meets or exceeds a predetermined angle deviation.

12 Claims, 10 Drawing Sheets

(56) References Cited

U.S. PATENT DOCUMENTS

| | | | |
|---|---|---|---|
| 8,933,322 B2 | 1/2015 | Banin et al. | |
| 8,973,570 B2 | 3/2015 | Stavrou et al. | |
| 9,074,797 B2 | 7/2015 | Miller et al. | |
| 9,182,470 B2 | 11/2015 | Heckendorn | |
| 9,482,449 B2 | 11/2016 | Cole et al. | |
| 9,494,341 B2 | 11/2016 | Trujillo et al. | |
| 9,503,016 B2 | 11/2016 | Sakai et al. | |
| 9,631,840 B2 | 4/2017 | Corio | |
| 10,006,665 B2 | 6/2018 | Maxey et al. | |
| 10,284,138 B2 | 5/2019 | Chaouki Almagro et al. | |
| 10,326,401 B2 | 6/2019 | Wu | |
| 10,340,839 B2 | 7/2019 | Almy et al. | |
| 10,340,840 B2 | 7/2019 | Almy et al. | |
| 10,520,224 B2 | 12/2019 | Linderman et al. | |
| 10,594,252 B2 | 3/2020 | Schimelpfenig et al. | |
| 10,651,782 B2 | 5/2020 | Patnude | |
| 10,690,381 B2 | 6/2020 | Saeed | |
| 10,931,224 B2 | 2/2021 | Praca et al. | |
| 11,300,979 B2 | 4/2022 | Kesler et al. | |
| 11,394,343 B1 | 7/2022 | LoBue et al. | |
| 2009/0320827 A1 | 12/2009 | Thompson et al. | |
| 2010/0263659 A9 | 10/2010 | Taylor et al. | |
| 2011/0240006 A1 | 10/2011 | Linke et al. | |
| 2011/0308512 A1 | 12/2011 | Nakasato et al. | |
| 2012/0216852 A1 | 8/2012 | Almy et al. | |
| 2013/0032135 A1 | 2/2013 | Waterhouse et al. | |
| 2013/0112188 A1 | 5/2013 | Reynolds | |
| 2013/0284162 A1 | 10/2013 | Burton | |
| 2014/0054433 A1 | 2/2014 | Reisch et al. | |
| 2014/0090638 A1 | 4/2014 | Grushkowitz | |
| 2015/0377518 A1* | 12/2015 | Maxey .................... | F24S 50/20 126/714 |
| 2016/0329860 A1 | 11/2016 | Kalus et al. | |
| 2017/0179872 A1* | 6/2017 | Almy ...................... | H02S 20/32 |
| 2019/0199276 A1 | 6/2019 | Bailey et al. | |
| 2021/0320616 A1 | 10/2021 | El Safty | |
| 2022/0200522 A1 | 6/2022 | de Fresart et al. | |
| 2023/0378901 A1* | 11/2023 | Kesler ..................... | H02S 20/32 |

FOREIGN PATENT DOCUMENTS

| | | | |
|---|---|---|---|
| CN | 207504800 | U | 6/2018 |
| CN | 110822742 | A | 2/2020 |
| DE | 102006058995 | A1 | 6/2008 |
| EP | 3890183 | A1 | 10/2021 |
| EP | 3680575 | B1 | 12/2021 |
| ES | 2389794 | B2 | 10/2013 |
| GB | 2506846 | A | 4/2014 |
| JP | 4651469 | B2 | 3/2011 |
| WO | 2010008584 | A2 | 1/2010 |
| WO | 2012072204 | A1 | 6/2012 |
| WO | 2019066634 | A1 | 4/2019 |
| WO | 2019113650 | A1 | 6/2019 |
| WO | 2020025107 | A1 | 2/2020 |
| WO | 2021030109 | A1 | 2/2021 |

* cited by examiner

APPARATUS AND METHOD FOR PROVIDING ACTIVE HELIX PREVENTION IN A SINGLE AXIS SOLAR TRACKER SYSTEM

CROSS-REFERENCE TO RELATED APPLICATION

The present application claims the filing benefit of U.S. Provisional Application Ser. No. 63/483,835, filed Feb. 8, 2023, the disclosure of which is incorporated herein by reference in its entirety.

FIELD OF THE INVENTION

The present invention relates generally to solar tracker systems and, more particularly, to a single-axis solar tracker system having multiple photovoltaic modules mounted in an elongated single row and being rotated about a rotational axis by one or more drive motors.

BACKGROUND OF THE INVENTION

Single axis solar tracker systems are known for rotating long rows of photovoltaic modules synchronously about an axis of rotation to track the apparent path of the sun across the sky. The photovoltaic modules may be arranged side-by-side and operatively coupled to an elongated drive shaft, such as a torque tube, which is driven by one or more drive motors configured to rotate the torque tube, and the photovoltaic modules operatively coupled to the torque tube, about the axis of rotation defined by the torque tube. The torque tube may be supported along its length by the one or more drive motors and multiple, spaced-apart torque bearings of the row, which are mounted on respective support posts or piles which have respective lower ends driven into the ground.

Alternatively, the photovoltaic modules may be supported on rotatable tables which are arranged side-by-side in a long row and synchronously rotated about an axis of rotation of a drive shaft, such as a torque tube, by one or more drive motors to track the apparent path of the sun across the sky. The torque tube in this design may also be supported along its length by the one or more drive motors and by multiple, spaced-apart torque bearings or gear boxes, which are mounted on respective support posts or piles which have respective lower ends driven into the ground.

In either solar tracker system design as described above, the solar tracker system typically includes a tracker control unit which comprises a controller, a programmable logic controller, a microprocessor, a microcontroller or any other suitable control device, and memory (not shown), which is/are programmed to control and optimize the rotation of the plurality of photovoltaic modules (i.e., tilt) in a row so as to track the apparent motion of the sun across the sky for a particular geographical location and orientation of the solar tracker system. In this way, each tracker control unit rotates the photovoltaic modules of the respective solar tracker systems for maximizing energy collection by the solar tracking systems as is known in the art.

During proper operation of the solar tracker systems described above, the photovoltaic modules of each solar tracker system assume generally the same tilt angle in a row as the photovoltaic modules are synchronously rotated by the one or more drive motors. During this operation, one situation which may occur with single axis solar tracker designs, such as those described above, is that one or more rows of the solar tracker system may become twisted so as to assume a helix-like shape.

Helixing in one or more of the rows may be caused by several factors. One situation which may occur is failure of the torque tube itself. Since the torque tube is subjected to significant torque forces along its length during rotation of the photovoltaic modules, the torque tube may fail at one or more sections of the torque tube caused by a material failure, or at one or more universal joint couplings which couple sections of the torque tube together as described in U.S. Pat. No. 10,931,224, assigned to the common Assignee, which is incorporated herein by reference in its entirety. In an alternative situation, one or more of the torque bearings may fail which inhibits free rotation of the torque tube along a row. In yet another situation, one of the drive motors in a row having two or more drive motors may fail so that different sections of the torque tube driven by the drive motors do not assume the same or similar tilt angle, i.e., a generally common tilt angle, for the row. In yet another possible situation, the coupling of a torque tube to one side of a drive motor may fail, which may result in a portion of row of photovoltaic modules not obtaining the same tilt angle of the other photovoltaic modules in the row. Yet another situation which may occur is that the photovoltaic modules in a row may be subjected to a significant wind load or snow load along a section of the row, with the wind load or snow load causing one or more photovoltaic modules to assume a different tilt angle than other photovoltaic modules in the row.

Those skilled in the art will appreciate that helixing may result in inefficient energy collection by the affected photovoltaic modules in a twisted row as the affected modules are not optimally aligned with the sun due to the helixing. Moreover, continued rotation of the photovoltaic modules in a row affected by helixing may result in damage to one or more of the drive motors, one or more of the torque bearings, one or more of the photovoltaic modules, and/or the torque tube in the affected row.

Therefore, it would be desirable to provide a single axis tracker system that is less susceptible to helixing in a row of photovoltaic modules which may result in damage to one or more of the drive motors, one or more of the torque bearings, one or more of the photovoltaic modules, and/or the torque tube in the affected row of the solar tracker system.

BRIEF DESCRIPTION OF THE DRAWINGS

The accompanying drawings, which are incorporated in and constitute a part of this specification, illustrate an embodiment of the invention and, together with a general description of the invention given above, and the detailed description given below, serve to explain the invention.

DETAILED DESCRIPTION OF THE INVENTION

Figure 1:
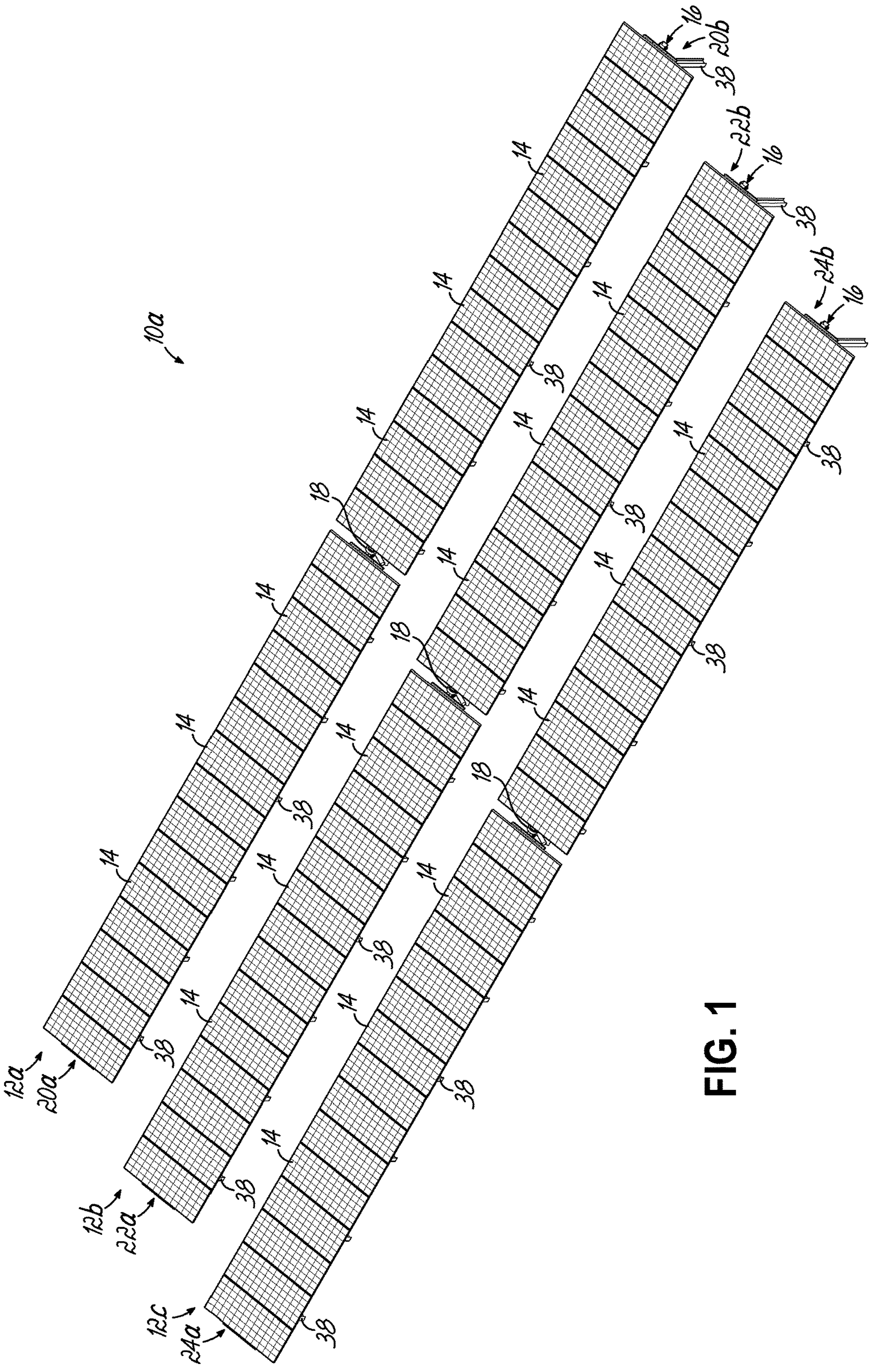
FIG. 1 is a top perspective view of a plurality of solar tracking systems mounted to form a solar array, with each solar tracking system including a plurality of photovoltaic modules mounted in a single elongated row and a single drive motor for rotating the row of photovoltaic modules about a rotational axis.

Referring now to the figures, and to FIG. 1 in particular, an exemplary solar array 10*a* is shown including multiple rows of solar tracking systems 12*a*-12*c*. As will be described on more detail below, each solar tracking system 12*a*-12*c* of the exemplary solar array 10*a* includes a plurality of photovoltaic modules 14 mounted in a single row. Each of the multiple rows of the solar tracking systems 12*a*-12*c* includes a respective drive shaft 16 which rotates the photovoltaic modules 14 synchronously about a respective axis of rotation defined by the respective drive shafts 16 so that the photovoltaic modules 14 track the apparent path of the sun across the sky as is known in the art. Each solar tracking system 12*a*-12*c* includes one or more drive motors 18, such as electric drive motors, that are operatively coupled to the respective drive shafts 16 in a respective row to synchronously rotate the plurality of photovoltaic modules about the respective axis of rotation.

Various alternatives for providing power to a row include AC power, battery power, a stand alone photovoltaic module, a parasitic photovoltaic's module, or a parasitic off motor, for example, as will be understood by those of ordinary skill in the art.

In the exemplary solar array embodiment of FIG. 1, each solar tracking system 12*a*-12*c* includes a single drive motor 18 operatively coupled to a respective drive shaft 16 for rotating the photovoltaic modules 14 about the axis of rotation defined by the respective drive shaft 16 of the row. In one embodiment, each drive motor 18 may comprise a conventional slew drive or any other suitable motor known to those of ordinary skill in the art which is located generally centrally in the respective row between opposite free ends 20*a*-20*b*, 22*a*-22*b* and 24*a*-24*b* of each respective solar tracking system 12*a*-12*c*. Of course, other types of suitable drive motors 18 and/or other locations of the drive motors 18 are possible as well without departing from the spirit and scope of the present invention. For example, while not shown, a single drive motor may be mounted at one free end of one or more of the solar tracking systems 12*a*-12*c*, with the single drive motor 18 being operable to rotate the elongate drive shaft 16 from one free end of the drive shaft 16 as fully described in U.S. Pat. No. 10,931,224, incorporated herein by reference above.

Figure 1A:
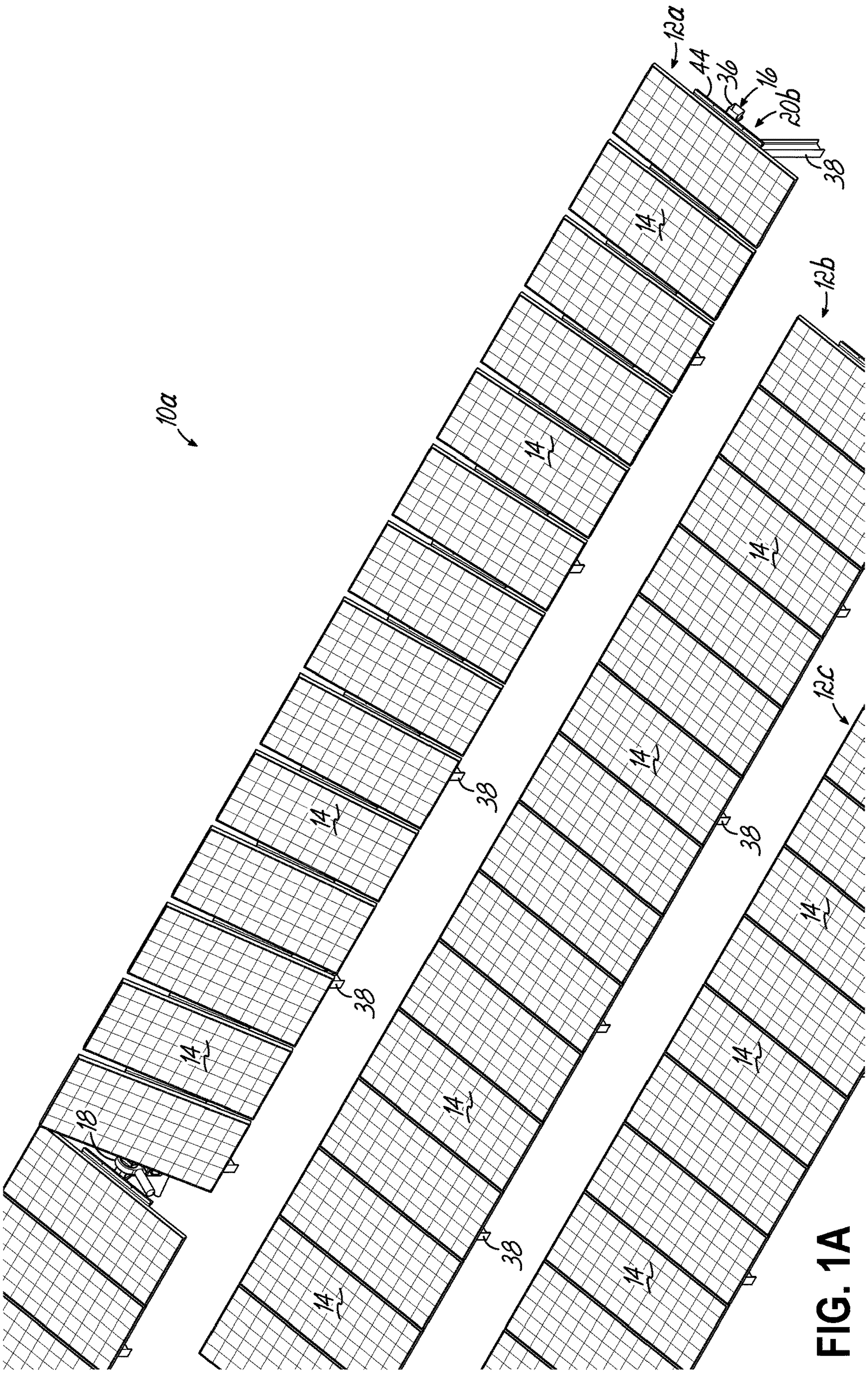
FIG. 1A is a view similar to FIG. 1, diagrammatically illustrating helixing of the plurality of photovoltaic modules in one of the single rows.
Figure 1B:
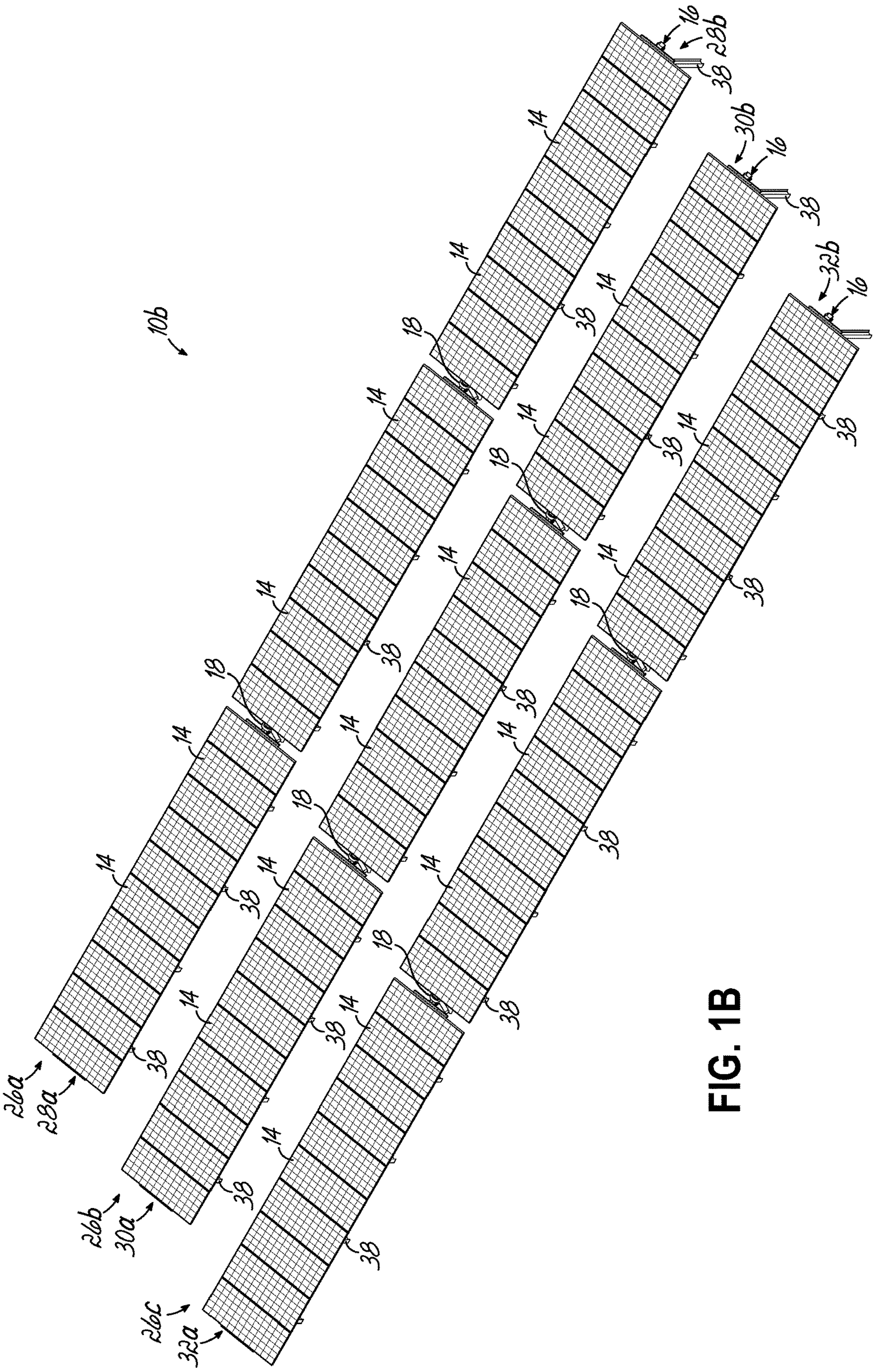
FIG. 1B is a view similar to FIG. 1, illustrating a pair of motors in each of the single rows for rotating the row of photovoltaic modules about a respective rotational axis.

In an alternative embodiment to the solar array 10*a* shown in FIG. 1, and now referring now to FIG. 1B, an exemplary solar array 10*b* is shown, where like numerals represent like parts to the exemplary solar array 10*a* of FIG. 1. In this embodiment, the solar array 10*b* includes multiple rows of solar tracking systems 26*a*-26*c* as described above, with the difference in design in this embodiment being that multiple drive motors 18 (two shown) are operatively coupled to a respective drive shaft 16 of a respective solar tracking system 26*a*-26*c* for rotating the photovoltaic modules 14 about the axis of rotation defined by the respective drive shaft 16 of the row. In this embodiment, similar to the embodiment of FIG. 1, each drive motor 18 may comprise a conventional slew drive known to those of ordinary skill in the art, or any other suitable drive motor known in the art as described above. In the embodiment of FIG. 1B, the pair of drive motors 18 in each row are located in spaced-apart intervals in the respective row between the opposite free ends 28*a*-28*b*, 30*a*-30*b* and 32*a*-32*b* of each respective solar tracking system 26*a*-26*c*. In the embodiment shown, the pair of drive motors 18 are located at approximately one-third and two-third intervals of the length of a respective row. Again, as described above, other locations of the drive motors 18 are possible as well without departing from the spirit and scope of the present invention.

In each of the solar array embodiments of FIGS. 1 and 1B, the operation and motion of each solar tracker system 12*a*-12*c* and 26*a*-26*c* is controlled by a dedicated tracker control unit 34 as shown in FIGS. 4-7 and 9. The tracker control unit 34 comprises a controller, a programmable logic controller, a microprocessor, a microcontroller or any other suitable control device, and memory (not shown), which is/are programmed to control and optimize the rotation of the plurality of photovoltaic modules 14 (i.e., tilt) in a row so as to track the apparent motion of the sun across the sky for a particular geographical location and orientation of the solar tracker systems 12*a*-12*c* and 26*a*-26*c*. In this way, each tracker control unit 34 rotates the photovoltaic modules 14 of the respective solar tracker systems 12*a*-12*c* and 26*a*-26*c* for maximizing energy collection by the solar tracking systems 12*a*-12*c* and 26*a* -26*c* as is known in the art. While not shown, the tracker control unit 34 of each solar tracker system 12*a*-12*c* and 26*a*-26*c* may be operatively coupled to a central control system as part of a distributed network of controllers for controlling overall operation of each of the solar tracker systems 12*a*-12*c* and 26*a*-26*c*.

In the exemplary embodiments of the solar tracker systems 12*a*-12*c* and 26*a*-26*c* shown in FIGS. 1 and 1B, the drive shaft 16 of each solar tracker system 12*a*-12*c* and 26*a*-26*c* may comprise an elongated, generally rigid, torque tube 36 having a desired torque stiffness, which may be either unitary in construction, or formed from multiple sections joined end-to-end, with the torque tube 36 extending along the respective longitudinal axis of each row to define the respective axes of rotation for the photovoltaic modules 14. In one embodiment, the torque tube 36 may be made of corrosion resistant metal and formed as hollow having a generally square cross-sectional shape as shown in in FIGS. 2A, 2B, 4 and 5. As will be appreciated by those of ordinary skill in the art, any suitable drive shaft, whether hollow or solid or made of metal or non-metal, and of any suitable cross-sectional shape, is contemplated by the present invention.

In the exemplary solar array embodiments of FIGS. 1 and 1B, each torque tube 36 is supported above the ground by multiple support posts or piles 38 which have respective lower ends driven into the ground, or are otherwise suitably mounted or supported relative to a base surface as known to those of ordinary skill in the art. The support posts 38 are longitudinally spaced at intervals along the respective longitudinal axes of the respective rows and may support a drive motor 18, such as the single drive motor 18 shown in each solar tracker system 12*a*-12*c* of FIG. 1, or a pair of drive motors 18 shown in each solar tracker system 26*a*-26*c* of FIG. 1B. Each drive motor 18 may be mounted to a respective upper end of a support post 38 by a pair of L-shaped brackets 40 (one shown in FIG. 5), or by any other suitable mounted method as known to those of ordinary skill in the art.

In one embodiment, the drive motors 18 have an operative state, e.g., an "ON" state, wherein the drive motors 18 are configured to provide a mechanical torque to the respective torque tubes 36 for rotating each row of photovoltaic modules 14 about the respective axes of rotation, either to track the apparent motion of the sun across the sky, or to be driven to another desired tilt position, such as a stow position. The drive motors 18 also have an inoperative state, e.g., an "OFF" state, wherein the drive motors 18 are stopped or otherwise disabled from applying a mechanical torque to the respective torque tubes 36.

Figure 2A:
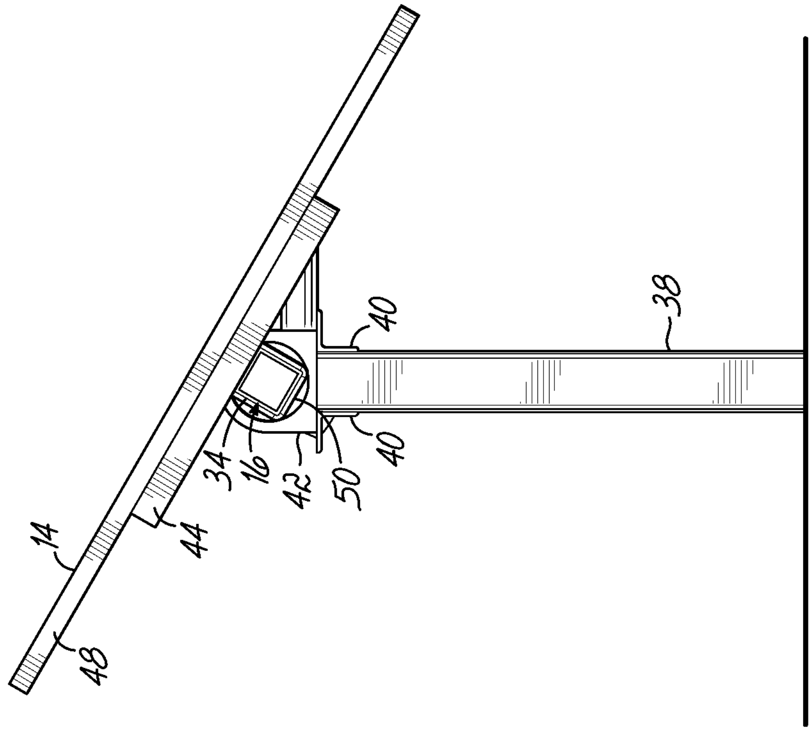
FIG. 2A is an end view of one of the solar tracker systems shown in FIG. 1.
Figure 2B:
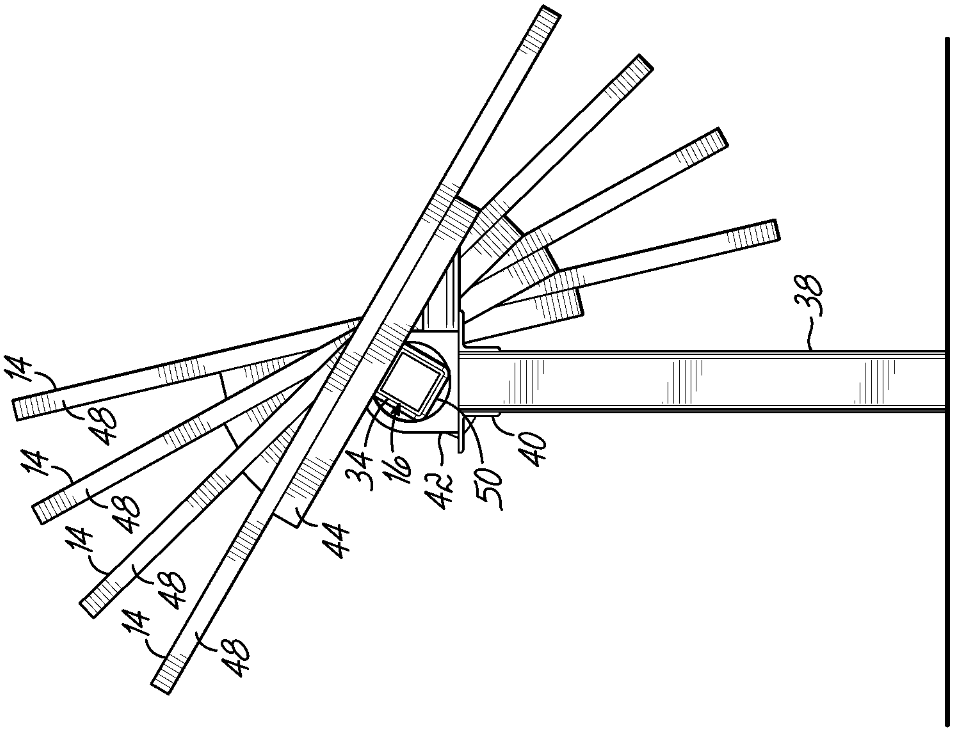
FIG. 2B is an end view of one of the solar tracker systems shown in FIG. 1A, illustrating helixing of the plurality of photovoltaic modules in one of the single rows.

Additionally, in the exemplary solar arrays 10*a* and 10*b* of FIGS. 1 and 1B, respectively, the support posts 38 which do not support a drive motor 18 are provided to support respective torque bearings 42 mounted to respective upper ends of the support posts 38 as shown in FIGS. 2A and 2B. Each torque bearing 42 may be mounted to a respective upper end of a support post 38 by a pair of the L-shaped brackets 40 as shown in FIGS. 2A and 2B, or by any other suitable mounted method as known to those of ordinary skill in the art. The torque bearings 42 are configured to facilitate rotation of the respective torque tubes 36 as the torque tubes 36 are driven by the drive motors 18 to rotate the photovoltaic modules 14 about their respective axes of rotation as described above. Any number of support posts 38, drive motors 18 and torque bearings 42 may be employed for a particular solar tracker system configuration.

Figure 3:
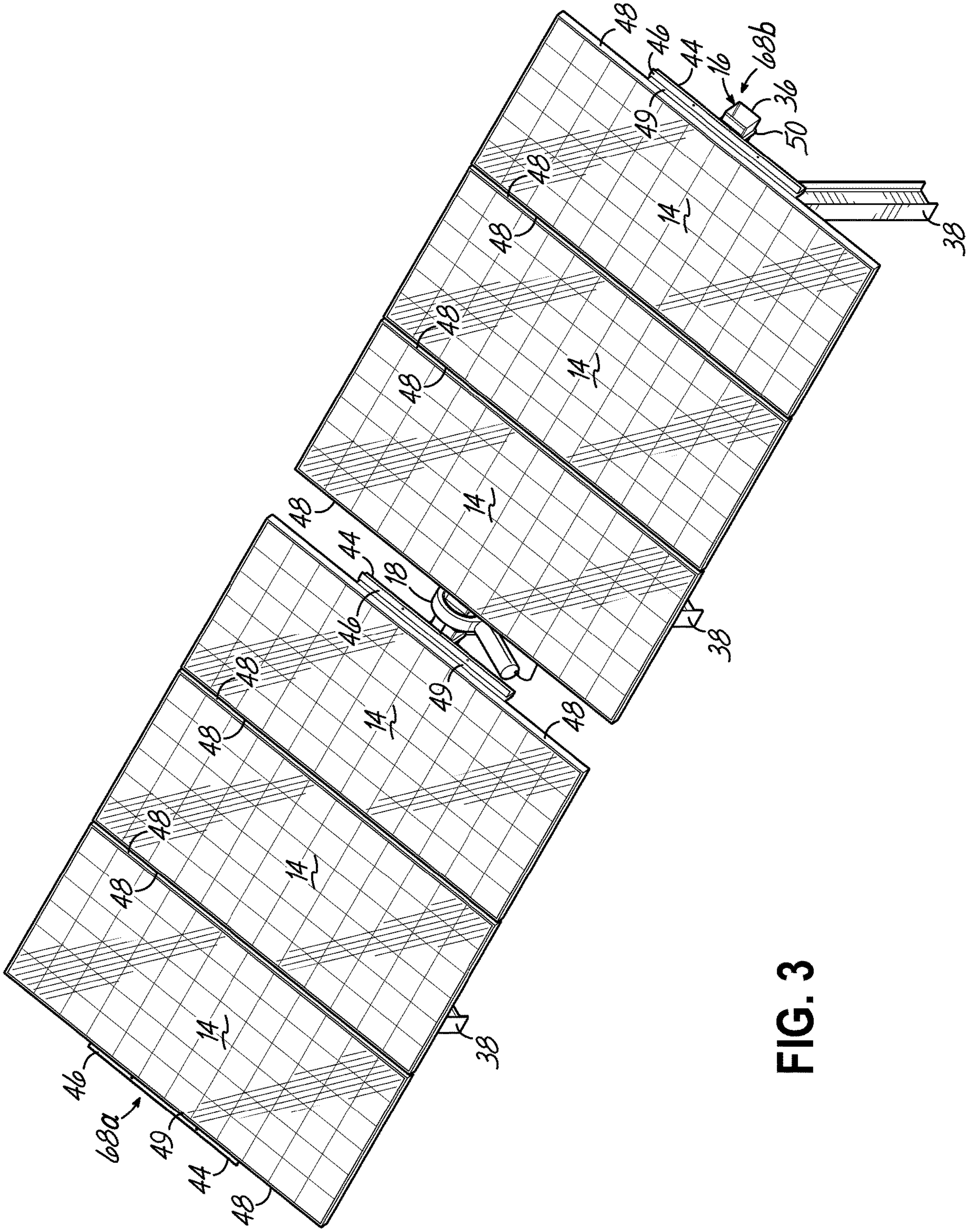
FIG. 3 is a partial top perspective view of a solar tracker system shown in FIG. 1.
Figure 4:
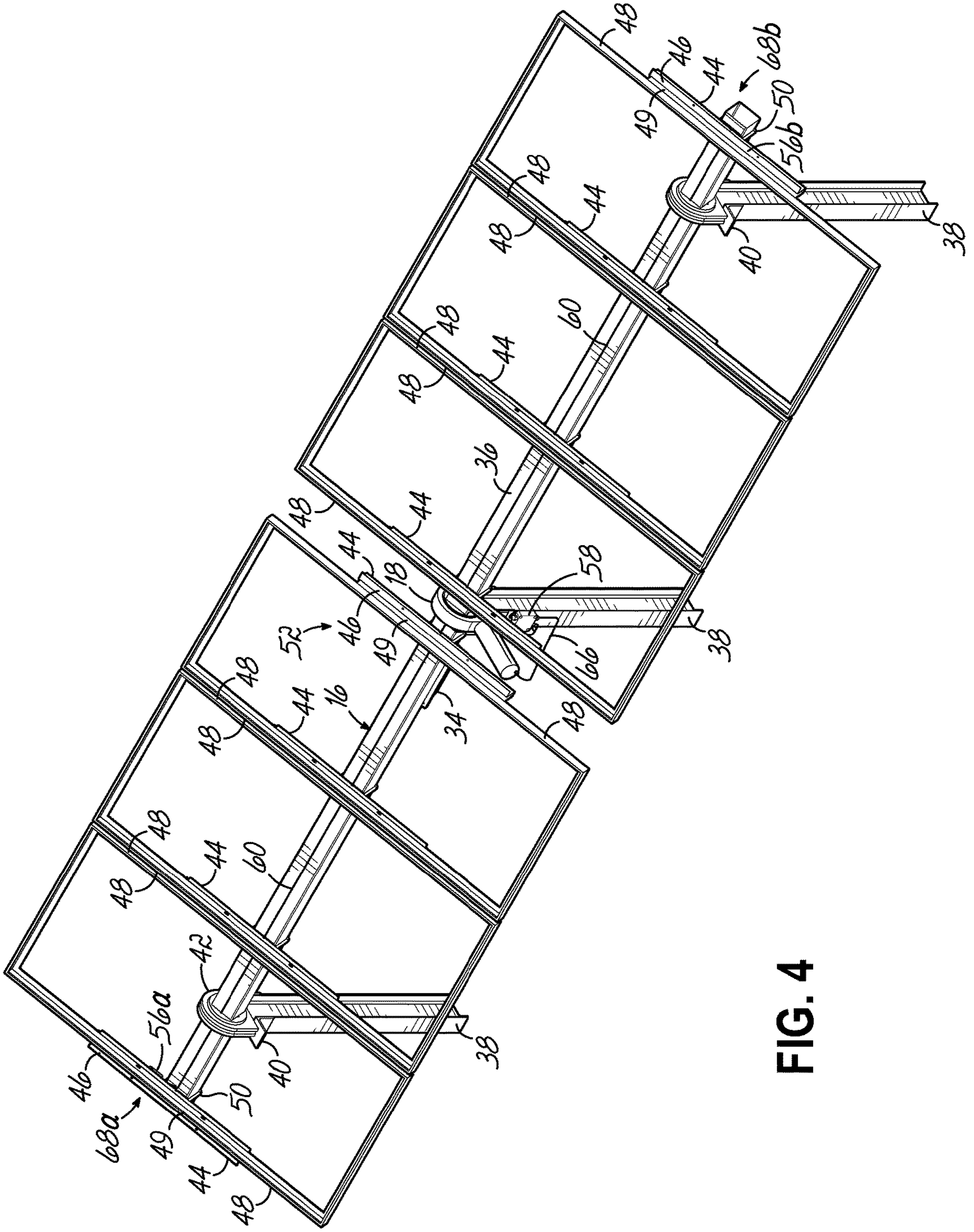
FIG. 4 is a view similar to FIG. 3 showing the solar tracker system with the photovoltaic cells removed from the frames of the photovoltaic modules.
Figure 5:
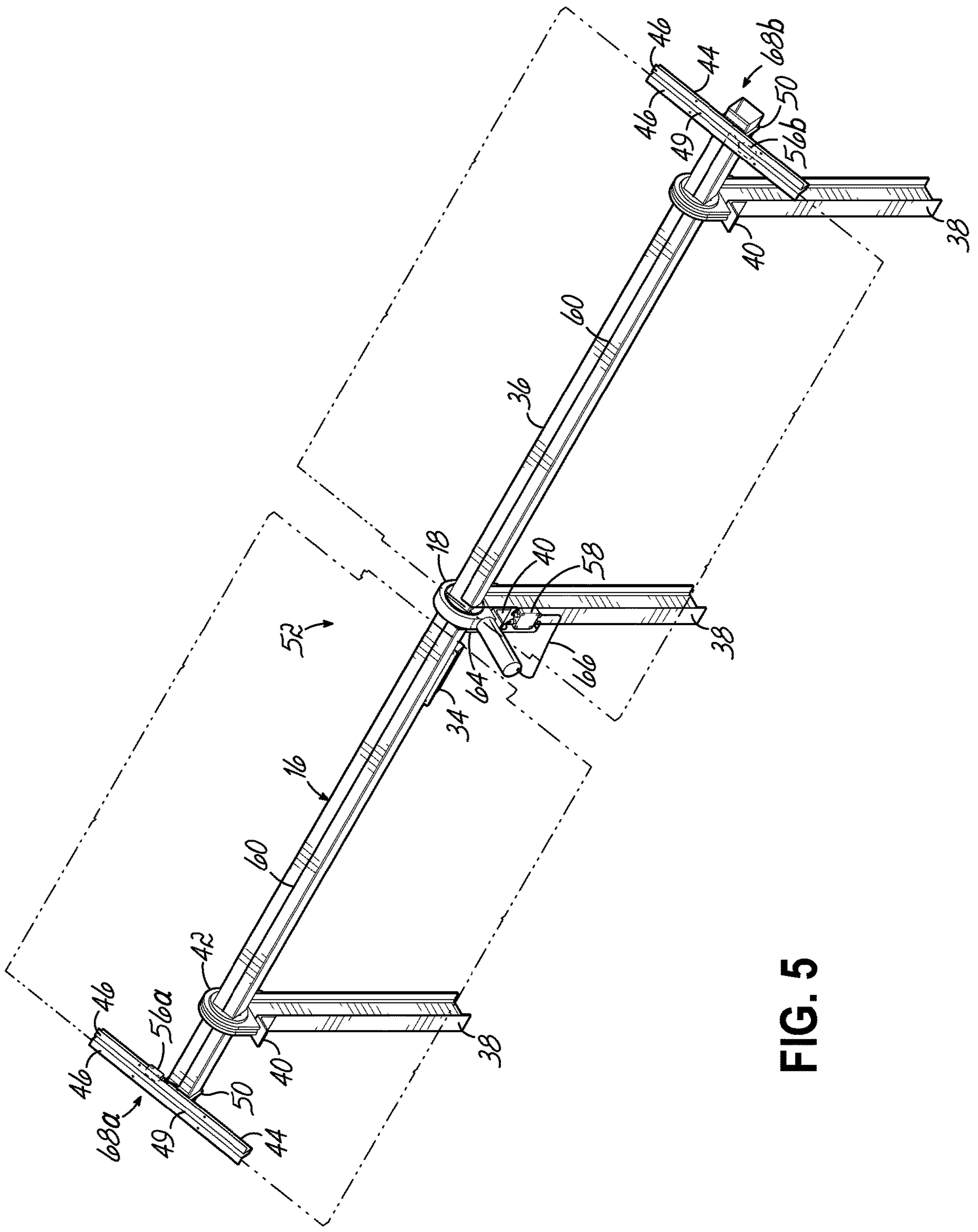
FIG. 5 is a view similar to FIG. 3 showing the solar tracker system with the plurality of photovoltaic modules entirely removed.

Further referring to the solar arrays 10*a* and 10*b* of FIGS. 1 and 1B, respectively, and, additionally to FIGS. 3-5, adjacent photovoltaic modules 14 located in a particular row are joined side-by-side by an intermediate rail 44. Each intermediate rail 44 has opposite, elongated side flanges 46, with one side flange 46 being operatively coupled to one side edge of the frame 48 of one photovoltaic module 14, and the opposite side flange 46 being operatively coupled to an adjacent side edge of the frame 48 of an adjacent photovoltaic module 14. In this way, an adjacent pair of rails 44 are operatively coupled to opposite side edges of a respective frame 48 of one of the photovoltaic modules 14 as shown in FIGS. 3-5.

As shown in FIG. 4, each rail 44 includes an elongated trough 49 located between the opposite side flanges 46 of a respective rail 44. Each rail 44 is mounted to a respective drive shaft 16 with the trough 49 engaging the respective drive shaft 16 so that the photovoltaic modules 14 are supported above, and in spaced relationship, to the respective drive shafts 16 as shown in FIGS. 2A and 2B. A U-bolt 50 (FIGS. 4 and 5) is operatively coupled to the trough 49 of each rail 44 and has legs which engage and encircle the respective drive shafts 16 so that each U-bolt 50 is configured to rotate with rotation of the respective drives shaft 16 as the photovoltaic modules 14 are rotated about their respective axes of rotation.

In an alternative embodiment not shown, a solar array may be constructed similar to the solar array fully described in U.S. Pat. No. 10,931,224 which has been fully incorporated herein as set forth above. As described in this reference, each solar tracker system of the solar array may comprise a single axis solar tracker comprising a row of modular tables, with each table supporting one or more photovoltaic modules. Each table in a row may include a pair of support posts which each supports a gear box for rotationally supporting an elongated torque tube which is operatively connected to each table. An electric drive motor is provided at one end of the torque tube of a row to apply rotational torque to the torque tube to thereby rotate the tables of a row, and the photovoltaic modules supported thereby, about an axis of rotation to track the apparent motion of the sun across the sky.

As shown in FIGS. 1 and 1B, 2A and 3, during proper operation of the solar tracker systems 12*a*-12*c* and 26*a*-26*c*, the photovoltaic modules 14 of each solar tracker system 12*a*-12*c* and 26*a*-26*c* assumes generally the same tilt angle in a row as the photovoltaic modules 14 are rotated by the one or more drive motors 18. As described above, one situation which may occur with single axis solar tracker designs, such as those in the solar arrays 10*a* and 10*b* of FIGS. 1 and 1B, or with the solar array described in U.S. Pat. No. 10,931,224, is that one or more rows of the solar tracker systems 12*a*-12*c* and 26*a*-26*c* may become twisted so as to assume a helix-like shape as shown in FIGS. 1A and 2B. Helixing in one or more of the rows may be caused by several factors. One situation which may occur is failure of the torque tube 36 itself. Since the torque tube 36 is subjected to significant torque forces along its length during rotation of the photovoltaic modules 14, the torque tube 14 may fail at one or more sections of the torque tube 14 caused by a material failure, or at one or more universal joint couplings that couple sections of the torque tube 14 together as described in U.S. Pat. No. 10,931,224. In an alternative situation, one or more of the torque bearings 42 may fail which inhibits free rotation of the torque tube 36 along a row. In yet another situation, one of the drive motors 18 in a row having two or more drive motors 18 may fail so that different sections of the torque tube 14 driven by the drive motors 18 do not assume the same or similar tilt angle, i.e., a generally common tilt angle, for the row as shown in FIG. 1B. In yet another possible situation, the coupling of a torque tube 18 to one side of a drive motor 18 may fail, such as shown in the failure of the coupling of the torque tube 36 with the centrally mounted single motor 18 shown in FIG. 1A. Yet another situation which may occur is that the photovoltaic modules 14 in a given row may be subjected to a significant wind load or snow load along a section of the row, with the wind load or snow load causing one or more photovoltaic modules 14 to assume a different tilt angle than other photovoltaic modules in the row.

Regardless of the cause of helixing in a row of a solar tracking system, those skilled in the art will appreciate that helixing may result in inefficient energy collection by the affected photovoltaic modules 14 in a twisted row as the affected modules are not optimally aligned with the sun due to the helixing. Moreover, continued rotation of the photovoltaic modules 14 in a row affected by helixing may result in damage to one or more of the drive motors 18, one or more of the torque bearings 42, one or more of the photovoltaic modules, and/or the torque tube 36 in the affected row.

Figure 6:
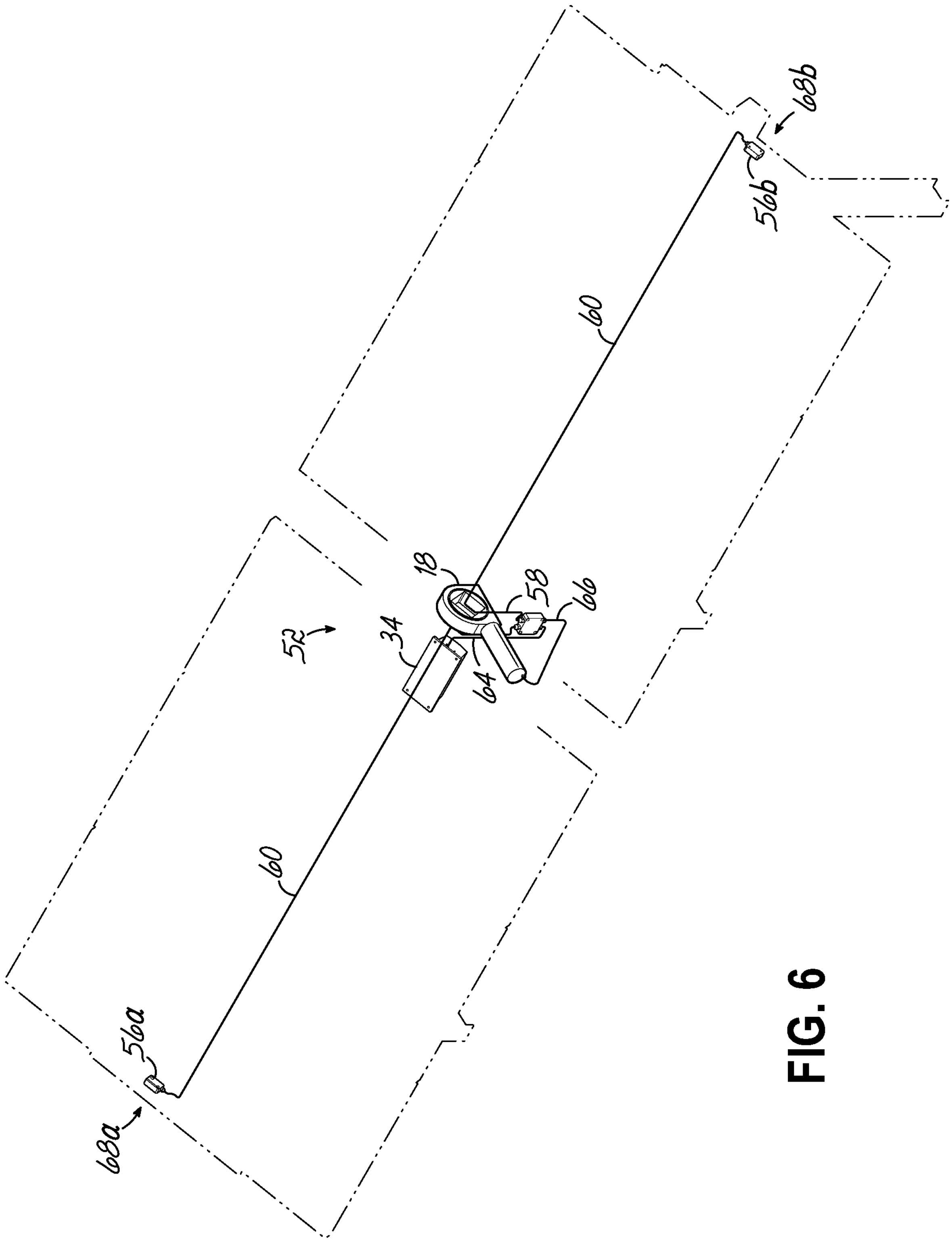
FIG. 6 is a view similar to FIG. 3 showing a single drive motor and a control system of a solar tracking system of FIG. 1.
Figure 7:
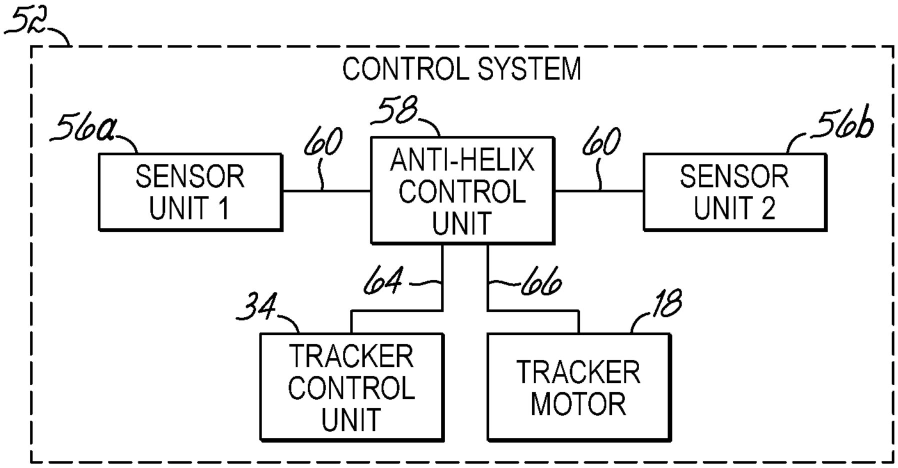
FIG. 7 is a diagrammatic view of a control system for use with a solar tracking system of FIG. 1 according to one embodiment of the present invention.
Figure 9:
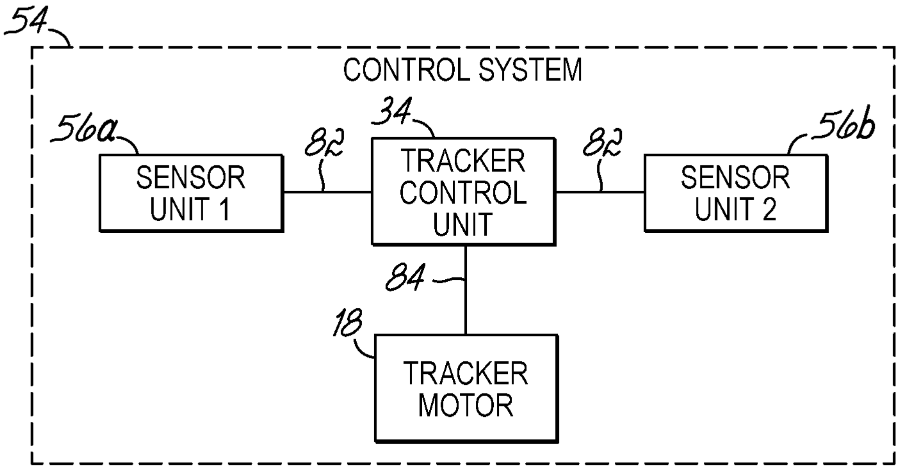
FIG. 9 is a diagrammatic view of a control system for use with a solar tracking system of FIG. 1 according to an alternative embodiment of the present invention.

According one aspect of the present invention, a control system 52 of FIGS. 6 and 7, or an alternative control system 54 of FIG. 9 is implemented in the solar tracker systems 12*a*-12*c* and 26*a*-26*c* of FIGS. 1 and 1B to detect the onset of a helixing condition or situation, and to stop further rotation of the affected row once the helixing condition or situation is detected. By preventing detrimental helixing in an affected row, any additional potential damage to the one or more of the drive motors 18, one or more of the torque bearings 42 and/or the torque tube 36 in the affected row is essentially prevented.

As shown diagrammatically in control system 52 of FIGS. 6 and 7, the control system 52 includes a pair of first and second angle sensors 56*a* and 56*b*, respectively, that are mounted at spaced-apart locations along the length of a respective row and are operatively connected, such as electrically coupled by way of example, to an anti-helix control unit 58. Each of the first and second angle sensors 56*a*, 56*b* may be hardwired to the anti-helix control unit 58 via suitable electrical conductors 60 or, in an alternative embodiment not shown, the first and second angle sensors 56*a*, 56*b* may communicate wirelessly with the anti-helix control unit 58. In the exemplary embodiments described herein, one or both of the first and second angle sensors 56*a* and 56*b* may comprise an inclinometer, an optical device, an encoder, an accelerometer, a gyroscope, or any other suitable angle detection device known to those of ordinary skill in the art.

Continuing reference to FIGS. 6 and 7, the anti-helix control unit 58 is also operatively connected, such as electrically coupled by way of example, to the tracker control unit 34 via a suitable electrical conductor 64 and to one or more of the drive motors 18 in a row of the respective solar tracker systems 12*a*-12*c* and 26*a*-26*c* via a suitable electrical conductor 66 as will be described in greater detail below. The electrical conductor 64 establishing an electrical connection between the anti-helix control unit 58 and the tracker control unit 34 may also be replaced with wireless communication.

The first angle sensor 56*a* is configured to detect an angle of at least one of the photovoltaic modules 14 at a first location of the first angle sensor 56*a*, and to generate first angle data indicative of an angle of rotation of the at least one photovoltaic module 14 at the first location.

Similarly, second angle sensor 56*b* is configured to detect an angle of at least one of the photovoltaic modules 14 at a second location of the second angle sensor 56*b*, and to generate second angle data indicative of an angle of rotation of the at least one photovoltaic module 14 at the second location.

For example, in the exemplary solar tracker system embodiment of FIGS. 5 and 6, which is intended to be representative of either of the solar tracker systems 12*a*-12*c* or 26*a*-26*b* of FIGS. 1 and 1B, the tracker control unit 34 may be mounted to one side of the torque tube 36 of a row, and the anti-helix control unit 58 may be mounted to a support post 38 that supports one of the drive motors 18. Of course, other suitable mounting locations of the tracker control unit 34 and anti-helix control unit 58 are possible as well.

Further referring to FIGS. 5 and 6, the first angle sensor 56*a* may be mounted proximate a free end 68*a* of a respective row of the solar tracker systems 12*a*-12*c* and 26*a*-26*c*, and the second angle sensor 56*b* may be mounted proximate an opposite free end 68*b* of the respective row of the solar tracker systems 12*a*-12*c* and 26*a*-26*c*. By "proximate" a free end of the solar tracker systems 12*a*-12*c* and 26*a*-26*c*, the term "proximate" is intended to mean that the sensor 56*a* or 56*b* is located so as to detect a tilt angle reflective of the tilt angle of an end-most photovoltaic module 14 at the location of the sensor 56*a* or 56*b*.

In the embodiment shown in FIGS. 5 and 6, the first angle sensor 56*a* may be mounted to an end-most rail 44 in a respective row, while the second angle sensor 56*b* may be mounted to an opposite end-most rail 44 of the respective row. Alternatively, the first angle sensor 56*a* and/or the second angle sensor 56*b* may be mounted to opposite end-most photovoltaic modules 14 of a row, or otherwise be mounted proximate opposite free ends of the torque tube 36.

In an alternative embodiment not shown, the first or second angle sensor 56*a* or 56*b* may be mounted proximate to a rail 44 that is itself mounted proximate the drive motor 18, while the other of the angle sensors 56*a* or 56*b* may be mounted proximate a free end 68*a* or 68*b* of the respective row.

In yet another alternative embodiment not shown, the first and second angle sensors 56*a* and 56*b* may be mounted in spaced-apart relationship at first and second locations along the longitudinal length of a respective row and between the opposite free ends 68*a* and 68*b* of the row.

In one embodiment as shown with continued reference to FIG. 7, the anti-helix control unit 58 is configured to control operation of the at least one drive motor 18 of a respective row between an operative state and an inoperative state. As described above according to an exemplary embodiment, the drive motors 18 have an operative state, e.g., an "ON" state, wherein the drive motors 18 are configured to provide a mechanical torque to the respective torque tubes 36 for rotating each row of photovoltaic modules 14 about the respective axes of rotation, either to track the apparent motion of the sun across the sky, or to be driven to another desired tilt position, such as a stow position. The drive motors 18 also have an inoperative state, e.g., an "OFF" state, wherein the drive motors 18 are stopped or otherwise disabled from applying a mechanical torque to the respective torque tubes 36.

According to one principle of the present invention, the anti-helix control unit 58 is configured to receive the respective the first and second angle data from the first and second angle sensors 56*a* and 56*b*. The anti-helix control unit 58 is configured to compare the respective first and second angle data received from the first and second and angle sensors 56*a* and 56*b*, and if there is a difference between the first angle data and the second angle data that meets or exceeds a predetermined angle deviation, the anti-helix control unit 58 is configured to transition the at least one drive motor 18 of the affected row from the operative state to the inoperative state. For example, if multiple drive motors 18 are present in a row, such as shown in the embodiment of FIG. 1B, the anti-helix control unit 58 is configured to transition all of the drive motors 18 of the affected row from the operative state to the inoperative state.

In one embodiment, the predetermined angle deviation may be in a range of between 2° and 5°, which may be indicative of an onset of a helixing situation or event. Of course, other angles, or other ranges of angles, for the predetermined angle deviation are possible as well depending on the particular application or installation.

Figure 8:
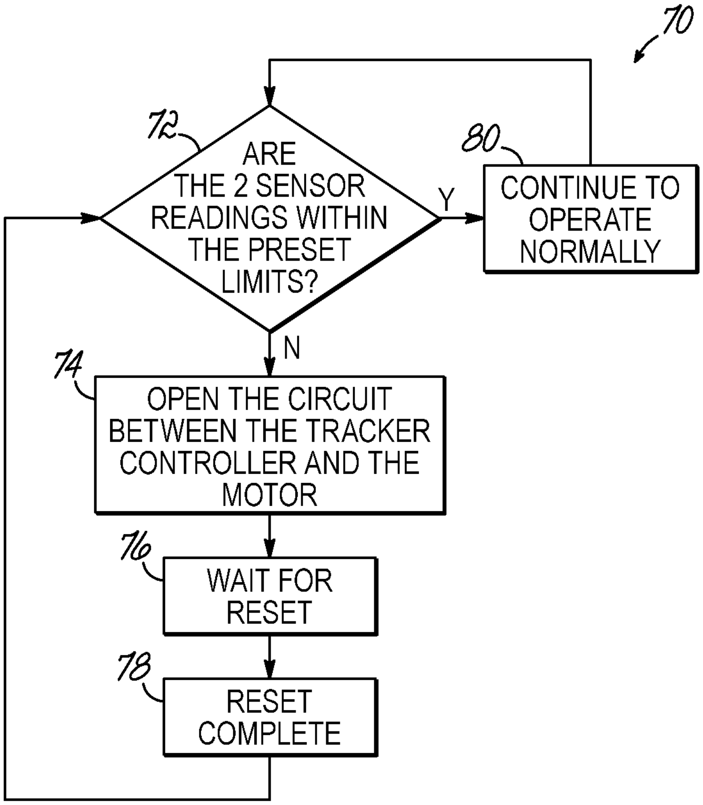
FIG. 8 is an exemplary flow diagram executed by the control system of FIG. 7.

An exemplary flow chart 70 is shown in FIG. 8 which may be executed by the control system 52 of FIG. 7. For example, at Step 72 of FIG. 8, the anti-helix control unit 58 of the control system 52 of FIG. 7 compares the received first and second angle data from the respective first and second angle sensors 56*a*, 56*b* to determine if a difference between the first and second angle data is between the preset limits, i.e., the difference between the first and second angle data does not meet, or alternatively exceed, a predetermined angle deviation. As described above, if multiple drive motors 18 are present in a row, such as shown in the embodiment of FIG. 1B, the anti-helix control unit 58 is configured to transition all of the drive motors 18 of the affected row from the operative state to the inoperative state.

At Step 74 of FIG. 8, if the difference between the first and second angle data meets, or alternatively exceeds, a predetermined angle deviation, the anti-helix control unit 58 breaks a circuit between the tracker control unit 34 and the at least one drive motor 18 to transition the at least one drive motor 18 from its operative state to its inoperative state. As described above, the at least one drive motor 18 stops applying rotational torque to the torque tube 36 when it is transitioned to the inoperative state.

As shown at Steps 76 and 78 of FIG. 8, the anti-helix control unit 58 waits for a reset and, after the reset is completed, the anti-helix control unit 58 resumes to compare the subsequently received first and second angle data as described above.

As shown at Step 80 of FIG. 8, in the event the difference between the first and second angle data does not meet, or alternatively does not exceed, the predetermined angle deviation, the anti-helix control unit 58 continues to operate normally as described above.

In the alternative control system 54 of FIG. 9, the functionality of the anti-helix controller 58 is implemented in the tracker control unit 34 so that the tracker control unit 34 is configured to control operation of the at least one drive motor 18 of a respective row between an operative state and an inoperative state. If multiple drive motors 18 are present in a row, such as shown in the embodiment of FIG. 1B, the tracker control unit 34 is configured to control operation of all drive motors 18 of a respective row between an operative state and an inoperative state.

In this embodiment, the pair of first and second angle sensors 56*a* and 56*b*, respectively, are mounted at spaced-apart locations along the length of a respective row and are electrically coupled to the tracker control unit 34. Each of the first and second angle sensors 56*a*, 56*b* may be operatively connected, such as hardwired by way of example, to the tracker control unit 34 via suitable electrical conductors or, in an alternative embodiment not shown, the first and second angle sensors 56*a*, 56*b* may communicate wirelessly with the tracker control unit 34.

As shown in FIG. 9, the tracker control unit 34 is also electrically connected to one or more of the drive motors 18 in a row of the respective solar tracker systems 12*a*-12*c* and 26*a*-26*c* via a suitable electrical conductor 84.

In this embodiment, according to one principle of the present invention, the tracker control unit 34 is configured to receive the respective the first and second angle data from the first and second angle sensors 56*a* and 56*b*. The tracker control unit 34 is configured to compare the respective first and second angle data received from the first and second and angle sensors 56*a* and 56*b*, and if there is a difference between the first angle data and the second angle data that meets or exceeds a predetermined angle deviation, the tracker control unit 34 is configured to transition the at least one drive motor 18 of the affected row from the operative state to the inoperative state. If multiple drive motors 18 are present in a row, such as shown in the embodiment of FIG. 1B, the tracker control unit 34 is configured to transition all of the drive motors 18 of the affected row from the operative state to the inoperative state.

In this embodiment as well, the predetermined angle deviation may be in a range of between 2° and 5°, which may be indicative of an onset of a helixing situation or event. Of course, other angles, or other ranges of angles, for the predetermined angle deviation are possible as well depending on the particular application or installation.

Figure 10:
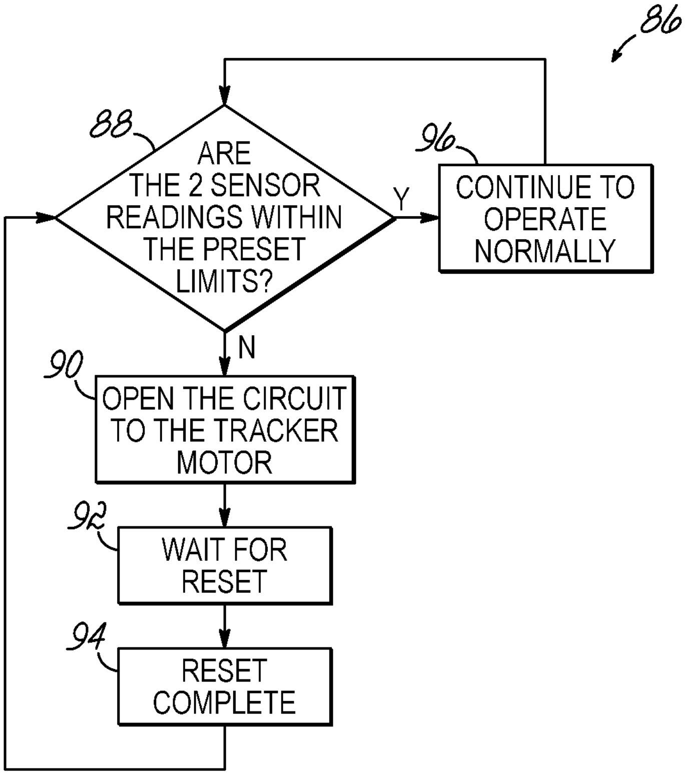
FIG. 10 is an exemplary flow diagram executed by the alternative control system of FIG. 9.

An exemplary flow chart 86 is shown in FIG. 10 which may be executed by the control system 54 of FIG. 9. For example, at Step 88 of FIG. 10, the tracker control unit 34 of the control system 54 of FIG. 9 compares the received first and second angle data from the respective first and second angle sensors 56*a*, 56*b* to determine if the difference between the first and second angle data is between the preset limits, i.e., the difference between the first and second angle data does not meet, or alternatively exceed, a predetermined angle deviation.

At Step 90 of FIG. 10, if the difference between the first and second angle data meets, or alternatively exceeds, a predetermined angle deviation, the tracker control unit 34 breaks a circuit between the tracker control unit 34 and the at least one drive motor 18 to transition the at least one drive motor 18 from its operative state to its inoperative state. As described above, the at least one drive motor 18 stops applying rotational torque to the torque tube 36 when it is transitioned to the inoperative state. As described above, if multiple drive motors 18 are present in a row, such as shown in the embodiment of FIG. 1B, the tracker control unit 34 is configured to transition all of the drive motors 18 of the affected row from the operative state to the inoperative state.

As shown at Steps 92 and 94 of FIG. 10, the tracker control unit 34 waits for a reset and, after the reset is completed, the tracker control unit 34 resumes to compare the subsequently received first and second angle data as described above.

As shown at Step 96 of FIG. 10, in the event the difference between the first and second angle data does not meet, or alternatively does not exceed, the predetermined angle deviation, the tracker control unit 34 continues to operate normally as described above.

As is readily apparent, the control systems 52 and 54 of FIGS. 7 and 9 are configured to detect the onset of a helixing condition or event, and to transition the at least one drive motor 18 of an affected row from the operative state to the inoperative state to substantially prevent further possible damage to the affected solar tracker system 12*a*-12*c* and 26*a*-26*c*. If multiple drive motors 18 are present in a row, the control systems 52 and 54 of FIGS. 7 and 9 are configured to transition all of the drive motors 18 from the operative state to the inoperative state.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A solar tracker system, comprising:

a plurality of photovoltaic modules mounted in single row;

a drive shaft operatively coupled to the plurality of photovoltaic modules and defining an axis of rotation about which the plurality of photovoltaic modules in the row synchronously rotate;

at least one drive motor operatively coupled to the drive shaft and configured to rotate the drive shaft to synchronously rotate the plurality of photovoltaic modules in the row about the axis of rotation;

a controller operatively connected to the at least one drive motor and configured to control operation of the at least one drive motor between an operative state and an inoperative state;

a first angle detector operatively connected to the controller and being mounted at a first location along a length of the single row; the first angle sensor generating first angle data indicative of a first angle of rotation of at least one of the plurality of photovoltaic modules in the row at the first location; and a second angle detector operatively connected to the controller and being mounted at a second location along the length of the single row and spaced from the first location, the second angle sensor generating second angle data indicative of a second angle of rotation of at least one of the plurality of photovoltaic modules in the row at the second location;

wherein the controller is configured to receive and compare the first angle data and the second angle data and, if there is a difference between the first angle data and the second angle data that meets or exceeds a predetermined angle deviation indicative of a helixing condition, the controller is operable to transition the at least one drive motor from the operative state to the inoperative state.

2. The solar tracker system of claim 1, wherein the first location of the first angle sensor is proximate to the at least one drive motor and the second location of the second angle sensor is proximate to a free end of the row.

3. The solar tracker system of claim 1, wherein the first location of the first angle sensor is proximate to one free end of the row and the second location of the second angle sensor is proximate to an opposite free end of the row.

4. The solar tracker system of claim 1, wherein the predetermined angle deviation is between 2° and 5°.

5. The solar tracker system of claim 1, wherein the drive shaft comprises a torque tube.

6. The solar tracker system of claim 5, further comprising:

a plurality of posts configured to be mounted in the ground at spaced-apart intervals; and a plurality of torque bearings each supported by a respective one of the plurality of posts, wherein each of the plurality of torque bearings is configured to rotatably support the torque tube.

7. The solar tracker system of claim 6, wherein the at least one drive motor is supported by one of the plurality of posts intermediate opposite free ends of the row.

8. The solar system of claim 1, further comprising:

a plurality of drive motors operatively coupled to the drive shaft and configured to rotate the drive shaft to synchronously rotate the plurality of photovoltaic modules in the row about the axis of rotation.

9. The solar tracker system of claim 8, wherein each of the plurality of drive motors is supported by a respective one of the plurality of posts located intermediate opposite free ends of the row.

10. The solar tracker system of claim 1, further comprising:

a plurality of rails operatively coupled to the drive shaft, wherein an adjacent pair of rails are operatively coupled to respective opposite side edges of a respective one of the plurality of photovoltaic modules.

11. The solar tracker system of claim 1, wherein the at least one drive motor comprises a slew drive or an electric motor.

12. The solar tracker system of claim 1, wherein at least one of the first and second angle detectors comprises one of an inclinometer, an optical device, an encoder, an accelerometer, or gyroscope.

* * * * *